G. W. McALISTER.
BALL BEARING COUPLING.
APPLICATION FILED MAR. 9, 1912.
1,049,890.
Patented Jan. 7, 1913.
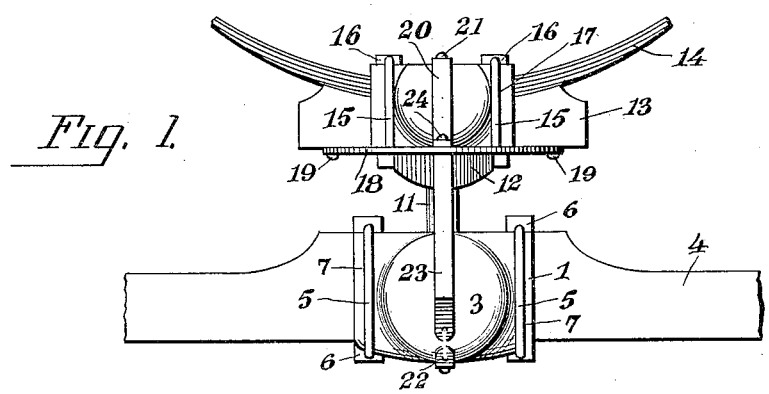
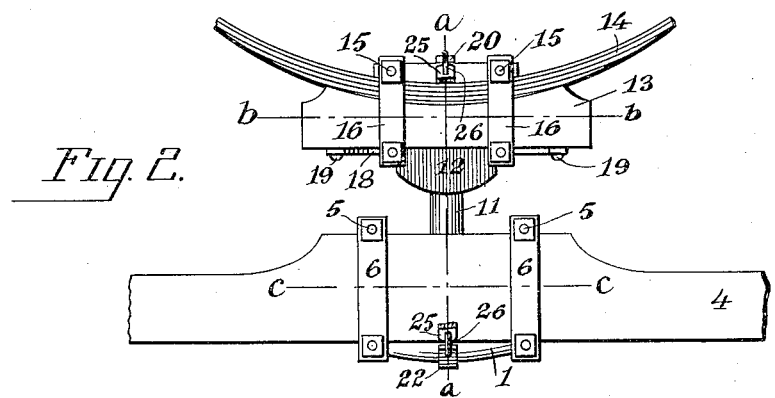
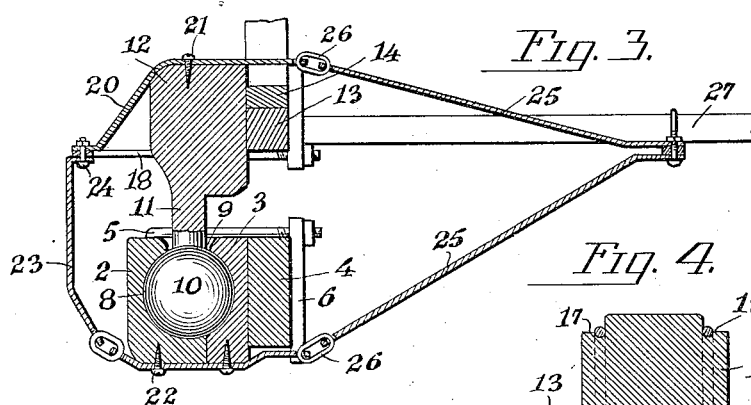
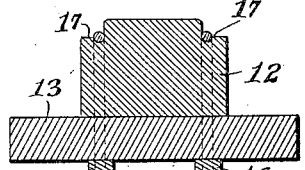
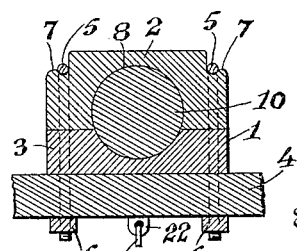
Inventor
G. W. McAlister
By Victor J. Evans
Attorney
Witnesses

UNITED STATES PATENT OFFICE.

GEORGE W. McALISTER, OF SCOTIA, MISSOURI.

BALL-BEARING COUPLING.

1,049,890. Specification of Letters Patent. Patented Jan. 7, 1913.

Application filed March 9, 1912. Serial No. 682,595.

*To all whom it may concern:*

Be it known that I, GEORGE W. McALISTER, a citizen of the United States, residing at Scotia, in the county of Crawford and State of Missouri, have invented new and useful Improvements in Ball-Bearing Couplings, of which the following is a specification.

My invention is an improved front axle coupling for wagons, carriages and other vehicles, the object of the invention being to provide an improved coupling of this kind which embodies a ball and socket joint between the front axle and the block which carries the spring, thus enabling the front axle to freely move angularly in a vertical plane with respect to the body of the vehicle to accommodate itself to inequalities of the road and also enabling the usual fifth wheel to be entirely dispensed with, my invention consisting in the construction, combination and arrangement of devices hereinafter described and claimed.

In the accompanying drawing:—Figure 1 is an elevation, showing one side of my improved front axle coupling. Fig. 2 is a similar view, showing the reverse side thereof. Fig. 3 is a central vertical sectional view of the same on the plane indicated by the line *a—a* of Fig. 2. Figs. 4 and 5 are detail sectional views on the planes indicated by the lines *b—b* and *c—c*, respectively, of Fig. 2.

In accordance with my invention, I provide a block 1, which comprises a pair of detachable members 2—3. This block is secured on one side of the center of the front axle 4 by means of a pair of clip bolts 5, the yokes 6 of which bear on one side of the axle, the member 2 of the block being on the opposite side of the axle and the central U-shaped portions of the clip bolt engaging shoulders 7 with which the block member 3 is provided. A spherical socket 8 is formed in the opposing sides of the block members 2—3, is open at its upper side as at 9 and in the said spherical socket is seated a ball 10 which is formed at the lower end of a king bolt 11. The king bolt is provided with an enlarged head 12, which in effect forms a block which bears against one side of the block 13 which carries the spring 14. Only the lower side or member of this spring 14 is here shown. The head 12 of the king bolt is secured to the spring carrying block 13 by means of clip bolts 15. The said clip bolts also secure the lower side of the spring 14 on the upper side of the block 13, their yokes 16 bearing against one side of the block 13 and one side of the spring and their U-shaped portions engaging shoulders 17 with which the head or block 12 of the king bolt is provided.

The U-shaped yoke strap 18 which is horizontally arranged, has its ends secured to the under side of the block 13, by means of bolts 19, the said yoke strap being substantially concentric with the king bolt. A brace strap 20 is secured on the upper end of the enlarged head of the king bolt, by a bolt or screw 21 and one end of the said brace strap extends downwardly and is secured on the central portion of the yoke strap 18. A strap 22 is secured to the under sides of the members 2—3 of the block 1 and one end of this strap 12 is connected by a link strap 23 to the central portion of the yoke strap 18 by the same bolt 24 which also secures the brace strap to said yoke strap. A pair of link rods 25 are connected by rings 26 to the opposite ends of the brace strap and the strap 22, and to these link rods is pivotally connected an iron or member 27 which may be secured either below the body of the vehicle or on the reach.

It will be understood from the foregoing description and by reference to the drawings that owing to the ball and socket connection formed by the king bolt and the block 1 between the spring carrying block 13 and the front axle, the front axle is free to turn not only horizontally but also to any angle necessitated by inequalities in the road surface, hence, enabling the front axle to conform to the road surfaces under all conditions and without straining its connection with the body of the vehicle or with the front spring. The yoke strap and connecting straps and link, in connection with the link rods serve to effectually brace the ball and socket coupling while permitting the free universal angular movement of the front axle.

I claim:—

A front axle coupling comprising in combination with a front axle and a spring carrying member, a block secured to the front side of the front axle and comprising a pair of detachable members having a spherical socket formed between them, a king bolt having its upper portion secured to the front side of the spring carrying member and having its stem provided at its lower end with a bolt which is mounted for universal angular movement in the socket of the said block, a yoke strap secured to the spring carrying member and projecting forwardly therefrom, a brace strap connected to the yoke strap and also connected to the head of the king bolt and extending rearwardly therefrom, a strap connected to the lower side of the socket block, a link connecting the last mentioned strap to the yoke strap, link rods connected to the brace strap and to the strap which is under the socket block, and a securing element connected to the rear ends of the said link rods.

In testimony whereof I affix my signature in presence of two witnesses.

GEORGE W. McALISTER.

Witnesses:
J. A. SUMMERS,
R. C. SCOTT.

Copies of this patent may be obtained for five cents each, by addressing the "Commissioner of Patents, Washington, D. C."